Dec. 21, 1954   J. CRITES   2,697,408
HEAT EXCHANGER SYSTEM INCORPORATING AIR TEMPERING MEANS
Filed March 31, 1950   2 Sheets-Sheet 2
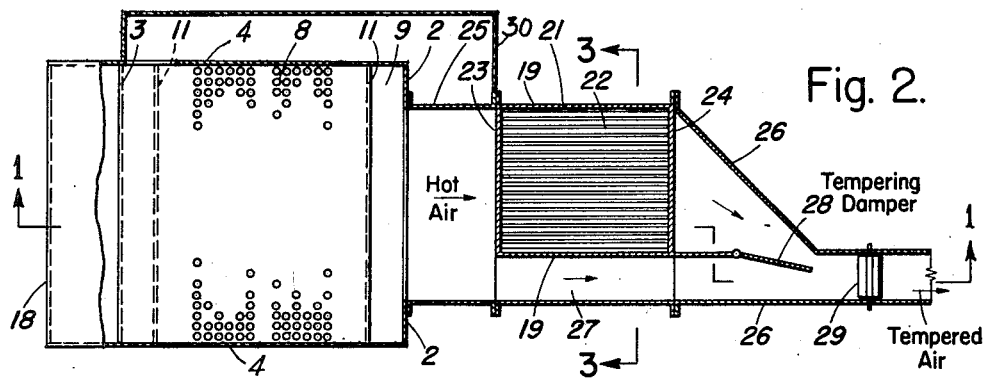
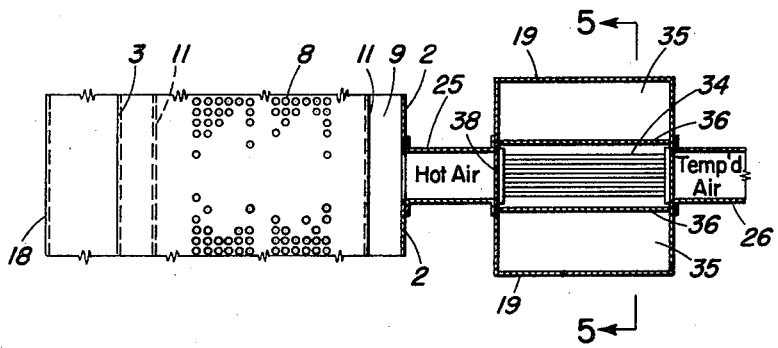
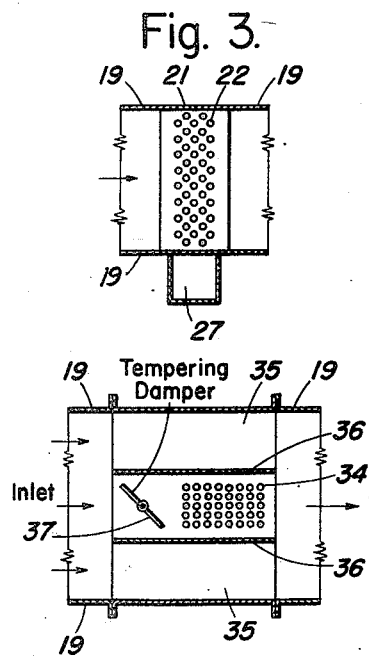
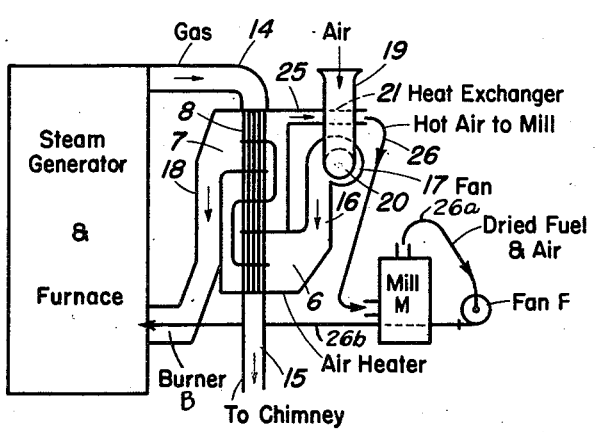
INVENTOR
Joe Crites
BY
C. H. Bryant
ATTORNEY United States Patent Office 2,697,408
Patented Dec. 21, 1954

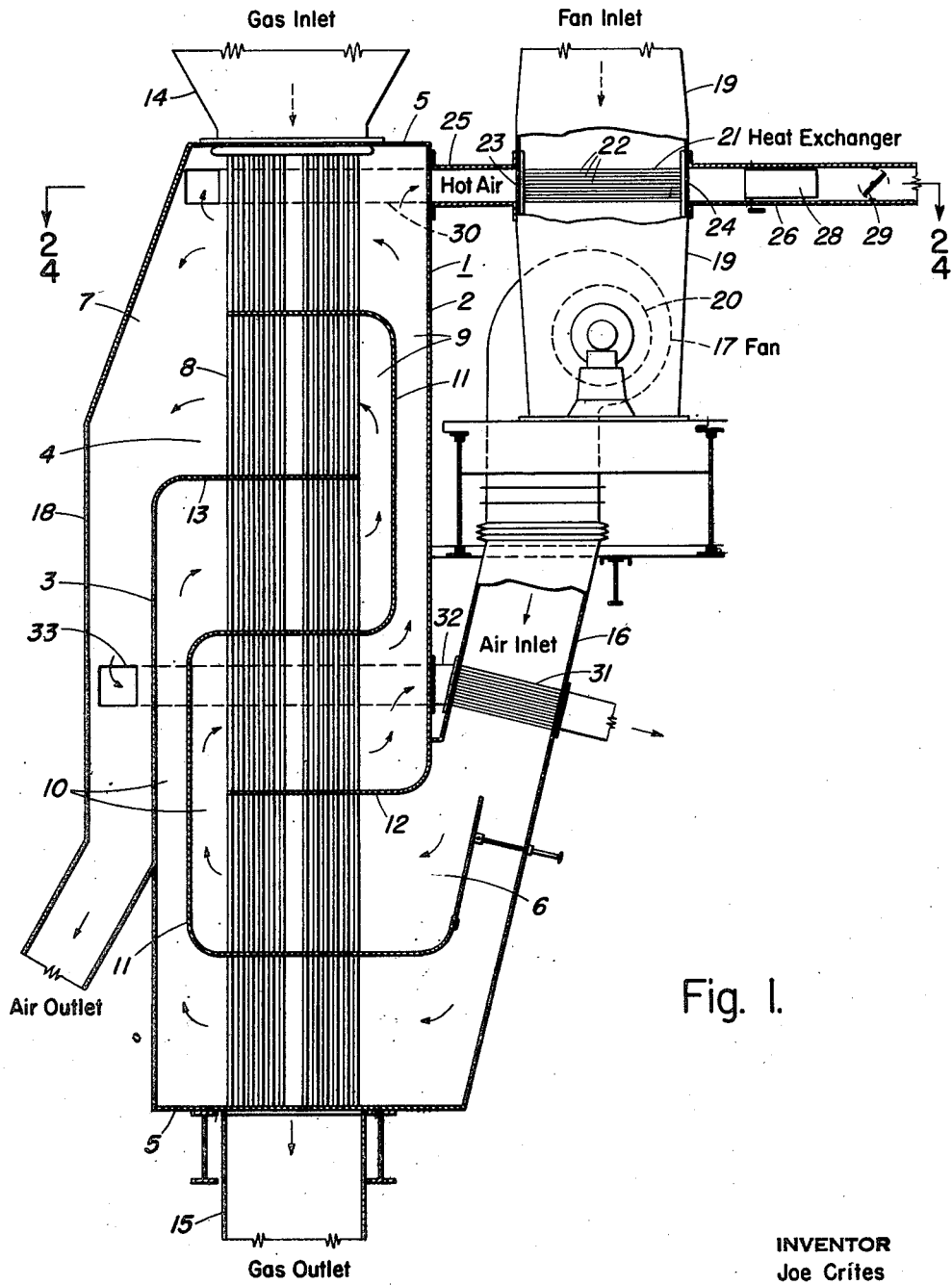
Fig. I.
INVENTOR
Joe Crites
BY R. J. Bryant
ATTORNEY

2,697,408

HEAT EXCHANGER SYSTEM INCORPORATING AIR TEMPERING MEANS

Joe Crites, Larchmont, N. Y., assignor to Combustion Engineering, Inc., New York, N. Y., a corporation of Delaware Application March 31, 1950, Serial No. 153,088

3 Claims. (Cl. 110—106)

This invention relates to systems for drying and burning wet fuels and particularly to systems wherein the air for the combustion of the fuel has its temperature raised by a heater from which heater a portion of the heated air is withdrawn and tempered for use in drying the fuel.

For example, an air heater used for heating the air for the combustion of pulverized coal within a furnace will have a portion of the heated air withdrawn from the heater and thence passed through a coal pulverizer of the air swept type, to dry the coal therein while it is being pulverized. The withdrawn air will be taken from a location in the air heater at which its temperature is sufficiently high to adequately dry the wettest coal that may be encountered within the mill. Such wet coal occurs but seldom. To dry the less wet coals which occur mostly the drying air need not be as hot and consequently considerable outside air at room temperature is admixed with the now too hot withdrawn air to lower its temperature before entering the mill. The withdrawn and tempering air mixture in passing through the mill dries the coal and carries it into the furnace.

The more tempering room air that is admixed with the hot air withdrawn from the air heater for the mill, the less will be the air that passes through the air heater. This occurs because there is a certain amount of total air required for proper combustion of the coal in the furnace which comprises the tempering air and the air flowing through the air heater.

The products of combustion leaving the furnace after being partly cooled, as by absorption of heat by a steam generator, pass through the air heater to serve as the heating gas for the air. By the use of said tempering air with the consequent reduction in air through the air heater, the ratio of air to gas within the heater is reduced. This reduction in the ratio of air to gas changes the performance of the air heater and it is therefore desirable to keep this ratio as high as possible.

It is an object of this invention to provide in a system for drying and burning wet fuels, improved means for tempering the heated air withdrawn from an air heater for fuel drying whereby a maximum flow of air is maintained through the air heater so as to maintain the highest possible ratio of air to gas within the heater for all anticipated wet fuels encountered.

How the foregoing, together with other objects and advantages as may hereinafter appear or are incident to my invention are realized, is illustrated in preferred form in the accompanying drawings, wherein Fig. 1 is an elevation in cross section taken on line 1—1 of Fig. 2, showing combinations of an air heater and a heat exchanger organized in accordance with the invention variably to cool withdrawn air;

Fig. 2 is a fragmentary plan in cross section taken on line 2—2 of Fig. 1;

Fig. 3 is an elevation in cross section taken on line 3—3 of Fig. 2;

Fig. 4 is a plan in cross section taken on line 4—4 of Fig. 1 and thus generally corresponding to Fig. 2 but showing a modified form of the heat exchanger;

Fig. 5 is a cross section in plan taken on line 5—5 of Fig. 4; and

Fig. 6 is a diagram of the aforesaid system for drying and burning wet fuels wherein there is included an air heater and a heat exchanger connected to a steam generator and a pulverizing mill and organized to provide the air tempering improvements of the present invention.

Referring to Figs. 1 and 2, the air heater 1 comprises a casing having front, rear and side walls 2, 3 and 4 and end plates 5. Air inlet and outlet openings 6 and 7 are provided in the front and rear walls of the heater respectively. A bank of tubes 8 extends longitudinally through the heater 1 and through the end plates 5 by which they are supported. The bank of tubes 8 is spaced from the front and rear walls 2 and 3 thereby forming front and rear channels 9 and 10. The sides of the tube tank 8 lie closely adjacent the side walls 4, of which there are two, one on each side of said bank.

Baffles 11, 12 and 13 extend transversely and longitudinally across the heater between side walls 4 and portions thereof extend across the tube bank 8 as shown in Fig. 1. These baffles 11, 12 and 13 divide the air entering the heater through inlet opening 6 and direct it to flow in parallel passes through channels 10 and 9 and transversely back and forth across the tube bank 8 and out of the heater through outlet opening 7, as shown by the arrows.

A gas inlet conduit 14 connects the inlet end of the bank of tubes 8 with a source of hot gas, such as the flue gas offtake from a steam generator (Fig. 6), and a gas outlet conduit 15 connects the outlet end of the bank of tubes 8 with a chimney (not shown). An air inlet conduit 16 connects air inlet opening 6 of the heater with the air fan 17 and an air outlet conduit 18 connects the outlet opening 7 of the heater with a furnace (Fig. 6), supplying air for combustion for fuel burned therein. An air intake conduit 19 connects to the air inlet 20 of air fan 17. Fan 17 is driven by any suitable motor means (not shown).

A heat exchanger 21 is located within the air intake duct 19 and comprises a bundle of tubes 22 extending transversely of the duct 19 having inlet and outlet ends 23 and 24 respectively. A duct 25 connects into one of the air passes, in this instance the pass 9 adjacent the front wall 2 of the air heater, to the inlet end 23 of the tubular heat exchanger 21. A duct 26 connects the outlet end 24 of the heat exchanger 21 to the air inlet of a pulverizing mill (Fig. 6). A by-pass duct 27 as shown in Figs. 2 and 3 extends around the heat exchanger 21 and connects into ducts 25 and 26. Damper 28 in duct 26 proportions the amounts of hot air that pass through the heat exchanger 21 and through the by-pass duct 27. A damper 29 (Figs. 1 and 2) in duct 26 controls the amount of heated air flowing to the mill. Both dampers 28 and 29 may be locked into any position by well known means (not shown).

Optionally the heat exchanger 21 may be connected by ducts 25 and 30 to the air outlet opening 7 of the air heater so as to draw hotter air from the air heater. In this case duct 25 will be opened to duct 30 and sealed off from the air pass, such as 9. Furthermore, the heat exchanger 21 may if desired be located within the fan discharge duct 16 as shown at 31 and its inlet connected as before into an air pass such as 9 by duct 32, or into the air outlet conduit 18 by ducts 32, 33. In this latter case duct 32 may be sealed off from the air pass, such as 9. As in the case of heat exchanger 21, a by-pass duct 27 is provided around exchanger 31 along with a damper 28 for proportioning the by-passed air.

The heat exchanger 21 or 31 shown in Figs. 1, 2 and 3 has its tube bundle 22 or 31 extending over the full cross sectional area of the air intake duct 19 or duct 16 while the by-pass duct 27 passes alongside the intake duct 19 or duct 16. Another form of heat exchanger 34 is shown in Figs. 4 and 5. In this form the tube bundle 34 extends only over a portion of the cross sectional area of the air intake duct 19 or duct 16, here shown across the middle, while the by-passes 35 extend across the remaining adjacent portions of the air intake duct and are separated from the tube bundle 34 by partitions 36. A damper 37 controls the flow of air through the heat exchanger 34. Heated air flows into the tube bundle 35 from air pass 9 via duct 25 into the inlet 38. The cooled air is discharged from the tube bundle 34 and flows via duct 26 to the mill (Fig. 6).

In operation, the fan 17 delivers air for combustion of the coal via conduits 19 and 16 into the inlet 6 of the air heater 1. Thence the air flows through the air heater via passes 10 and 9 back and forth across the tubes of tube bank 8 to outlet 7 and offtake 18. Offtake 18 conveys the heated air to the burners or to the auxiliary air openings in the furnace wherein the coal is burned (Fig. 6). The products of combustion from the furnace, which serve as the heating gas for the air, enter the air heater through conduit 14 (Fig. 6), thence pass through the tubes of tube bank 8 and after giving up heat to the air flowing over the tubes, are conveyed via conduit 15 to a chimney (not shown).

Wet fuels when pulverized in mills are dried within the mill during pulverization by heated air. This air flowing to the mill via duct 26 also serves as a carrier for the sufficiently finely pulverized fuel leaving the mill via duct 26a, passing through exhaust fan F, coal pipe 26b and burner B into the furnace. The amount of heat required for drying depends upon the wetness of the fuel and the amount of moisture to be removed therefrom and the air must be heated sufficiently to provide this heat. The heated air for this purpose is withdrawn from the air heater at a location at which the temperature, when considering the amount of air withdrawn and the amount of moisture to be removed, is sufficiently high to adequately dry the wettest fuel that may be encountered within the mill. Such withdrawal of air may in Fig. 1 occur through ducts 25 or 30 or 32 or 33, or through similar ducts which may tap the air from the air heater 1 at any other desirable location.

As previously mentioned, the temperature of the withdrawn air is chosen suitable for drying the wettest fuel to be encountered. Since such fuel occurs but seldom and less wet fuel occurs most of the time, the withdrawn air will normally be too hot and must be cooled to properly dry the less wet fuel. If the air is not cooled under these conditions to a temperature below approximately 200° F. fires may be started in the mill or fuel piping leading from the mill to the burners especially when using coal having a high volatile content. Such fires have occurred and caused explosions dangerous to life and limb of operating personnel.

Heretofore the cooling of this hot air was effected by the admixture of considerable outside air at room temperature. The mixture of the hot and cold air passes through the mill, effects drying of the fuel in the mill, and then carries the pulverized fuel through the burners into the furnace where it is burned.

The outside air thus furnishes a portion of air for combustion and therefore that much less quantity of air is passed through the air heater. This reduction of air through the air heater causes a reduction in the ratio of air to gas therein and thereby changes the performance of the air heater. In general, the more outside tempering air used, the less will be the air passing through the air heater.

According to the invention, the withdrawn air is cooled by passing it through the tubes of the heat exchanger, 21 or 31 over which the cold air flows to the air heater. By cooling the air in this manner, there is no tempering air admixed with the withdrawn air and the full amount of air for combustion passes through the air heater 1, a major portion thereof being delivered to the furnace via duct 18 and a minor portion via duct 26, mill M, duct 26a, fan F and fuel pipe 26b. Consequently there is no material reduction in the air to gas ratio within the air heater.

While I have shown and described the preferred embodiment of my invention, it will be understood that it may be used with other types of air heaters and that changes in construction, combination and arrangement of parts may be made without departing from the spirit and scope of the invention as claimed.

I claim:

1. In combination, a steam boiler, a furnace therefor, a fuel pulverizing mill delivering fuel to said furnace for burning therein, an air heater having an air inlet for receiving air to be heated by the waste gases from the boiler, a duct to lead some of the heated air from the air heater to the furnace for supporting combustion therein, a heat exchanger having a heat discharging surface and heat absorbing surface, a duct to lead the remainder of said heated air from the air heater over said heat absorbing surface to the mill for admixture with the pulverized fuel, a duct to lead at least a portion of said air to be heated over said heat discharging surface before entry thereof into said air heater, a duct to by-pass said heat exchanger, means for apportioning the air flow between said by-pass and said heat exchanger, and a conduit for leading said air and fuel mixture from said mill into the furnace for burning therein.

2. In a system for drying and burning wet fuels, comprising a furnace having an outlet for exhausting the hot combustion gases resulting from said burning of fuel, an air heater having a cold air inlet end for receiving air to be heated and a hot air discharge end, conduit means communicating with said furnace gas outlet and said air heater for delivering to the air heater furnace combustion gases for the purpose of heating in said air heater substantially all of the air used for combustion, additional conduit means communicating with said hot air discharge end and said furnace for delivering said heated air to the furnace for supporting combustion, a mill for pulverizing and drying said wet fuel including means for delivering said fuel to the furnace for burning, the combination of a heat exchanger having a heat receiving surface and a heat discharging surface; means for air flow communication between said heat discharging surface and the atmosphere and between said heat discharging surface and said cold air inlet end; means for air flow communication between said heat absorbing surface and said hot air discharge end and between said heat absorbing surface and said mill; an air conduit for by-passing said heat exchanger; and means for varying the flow of air through said by-pass duct whereby the temperature of the air flowing to said mill is controlled.

3. The method of operating a system for drying and burning pulverized fuel, which comprises supplying fuel to a pulverizing mill, pulverizing said fuel, passing relatively cold air through a heat exchanger to raise the temperature of said air, directing part of said heated air into a combustion chamber, extracting some of the heat from the remainder of said heated air by subjecting it to a variable and non-contacting heat exchange relationship with said cold air before entry of said cold air into said heat exchanger, controlling said heat exchange relationship to maintain the temperature of said remainder of heated air within a predetermined temperature range, directing said remainder of heated air to the mill for drying the fuel and admixture therewith while being pulverized, discharging said remainder of heated air with the fuel into the combustion chamber for the generation of combustion gases, and passing said combustion gases through said heat exchanger for raising the temperature of said cold air as aforesaid.

References Cited in the file of this patent

UNITED STATES PATENTS

| Number | Name | Date |
| --- | --- | --- |
| 1,753,363 | Coghlan et al. | Apr. 8, 1930 |
| 2,066,418 | O'Mara | Jan. 5, 1937 |
| 2,230,799 | Hobbs | Feb. 4, 1941 |
| 2,386,188 | Artsay | Oct. 9, 1945 |
| 2,392,325 | Kuhner | Jan. 8, 1946 |